(12) United States Patent
Mardente et al.

(10) Patent No.: US 10,873,639 B2
(45) Date of Patent: Dec. 22, 2020

(54) COOPERATIVE CACHING FOR FAST AND SCALABLE POLICY SHARING IN CLOUD ENVIRONMENTS

(71) Applicant: Cisco Technology, Inc., San Jose, CA (US)

(72) Inventors: Gianluca Mardente, San Francisco, CA (US); Maithili Narasimha, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 14 days.

(21) Appl. No.: 16/375,638

(22) Filed: Apr. 4, 2019

(65) Prior Publication Data

US 2020/0322437 A1 Oct. 8, 2020

(51) Int. Cl.
*H04L 29/08* (2006.01)

(52) U.S. Cl.
CPC ............. *H04L 67/16* (2013.01); *H04L 67/10* (2013.01)

(58) Field of Classification Search
CPC ...... H04L 67/16; H04L 67/10; H04L 45/7453
USPC ........................................................ 709/223
See application file for complete search history.

(56) References Cited

U.S. PATENT DOCUMENTS

| | | | | |
|---|---|---|---|---|
| 9,628,339 | B1* | 4/2017 | Thai | G06F 11/263 |
| 2014/0129700 | A1* | 5/2014 | Mehta | G06F 11/3636 |
| | | | | 709/224 |
| 2014/0214775 | A1* | 7/2014 | Shi | G06F 16/1748 |
| | | | | 707/692 |
| 2014/0365680 | A1* | 12/2014 | van Bemmel | H04L 67/327 |
| | | | | 709/232 |
| 2015/0244842 | A1* | 8/2015 | Laufer | H04L 69/22 |
| | | | | 370/392 |
| 2017/0366506 | A1* | 12/2017 | Panchalingam | H04L 65/1006 |
| 2018/0295036 | A1* | 10/2018 | Krishnamurthy | H04L 63/20 |
| 2020/0014688 | A1* | 1/2020 | Kohli | H04L 9/0891 |
| 2020/0052961 | A1* | 2/2020 | Soryal | G06F 9/44505 |

OTHER PUBLICATIONS

Qin, SDN Controller Placement at the Edge, Jan. 4, 2018 (9 pages).*
Screenshot of Qin reference website showing publish date, captured Jun. 3, 2020 (1 page).*

* cited by examiner

*Primary Examiner* — Quang N Nguyen
*Assistant Examiner* — Leon Y Tseng
(74) *Attorney, Agent, or Firm* — Polsinelli PC

(57) ABSTRACT

Systems, methods, and computer-readable media for distributing policies in a SDN environment through chunking. A policy can be chunked into a plurality of policy chunks having corresponding chunk identifications at a controller of a SDN environment. Each of the plurality of policy chunks can be hashed to create corresponding chunk hashes for each of the plurality of policy chunks. Further, the plurality of policy chunks, the chunk identifications of the plurality of policy chunks, and the chunk hashes of the plurality of policy chunks can be distributed from the controller of the SDN environment to an intermediate policy node in a fabric of the SDN environment. The chunk hashes and the chunk identifications of the plurality of policy chunks can be used to control distribution of the plurality of policy chunks to one or more edge nodes in the SDN environment.

20 Claims, 9 Drawing Sheets

COOPERATIVE CACHING FOR FAST AND SCALABLE POLICY SHARING IN CLOUD ENVIRONMENTS

TECHNICAL FIELD

The present technology pertains to distributing policies in a software defined networking (SDN) environment through chunking, and in particular to controlling distribution of policy chunks from an intermediate policy node to edge nodes in the SDN environment using chunk identifications and chunk hashes of the policy chunks.

BACKGROUND

In SDN environments, policies are implemented to control communication across nodes in the SDN environments. Specifically, in SDN environments, endpoints (EPs) and endpoint groups (EPGs) function as fundamental building blocks for accessing network services that are controlled through policies. More specifically, in SDN environments, contracts are used to implement policies for controlling communications between EPs and EPGs for providing network service access.

As SDN environments become more complex and as policies implemented in the SDN environments become larger, it becomes more difficult to effectively implement and maintain policies in SDN environments, e.g. for controlling EPGs in the SDN environments. Specifically, policies in an SDN environment can be maintained as trees that are pushed from a controller, while network states, e.g. states of policies in the SDN environment, are maintained at the controller. However, a large amount of back and forth communication between the controller and nodes in the SDN environment is needed to ensure that the policies are actually implemented correctly in the SDN environment. This problem is further exacerbated as the SDN environment and the policies grow in size and complexity. There therefore exist needs for systems and methods for more efficiently managing policy implementation in SDN environments to reduce the amount of communication between controllers and nodes in the SDN environments.

In maintaining policy state, a controller can track which policy is deployed in which part of a fabric of a SDN environment. Specifically, the controller can observe any changes either due to user modification of the policies or EP mobility, and subsequently reconcile the changes correctly and inform all affected network elements of the relevant changes. These tasks become further difficult to perform by the controller when the SDN environment and the policies grow in size and complexity. There therefore exist needs for systems and methods for efficiently managing policy implementations in SDN environments to solve these previously described deficiencies.

Further, while these problems exist in an on-premises basis, these problems become further exacerbated when SDN environments are extended outside of a premises/off-premises. Specifically, when an SDN environment is extended out of a datacenter to another environment, e.g. the cloud, these problems associated with policy distribution are further exacerbated. There therefore exist needs for systems and methods for efficiently managing policy implementation in SDN environments extended outside of centralized on-premises SDN environments to solve these previously described deficiencies.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
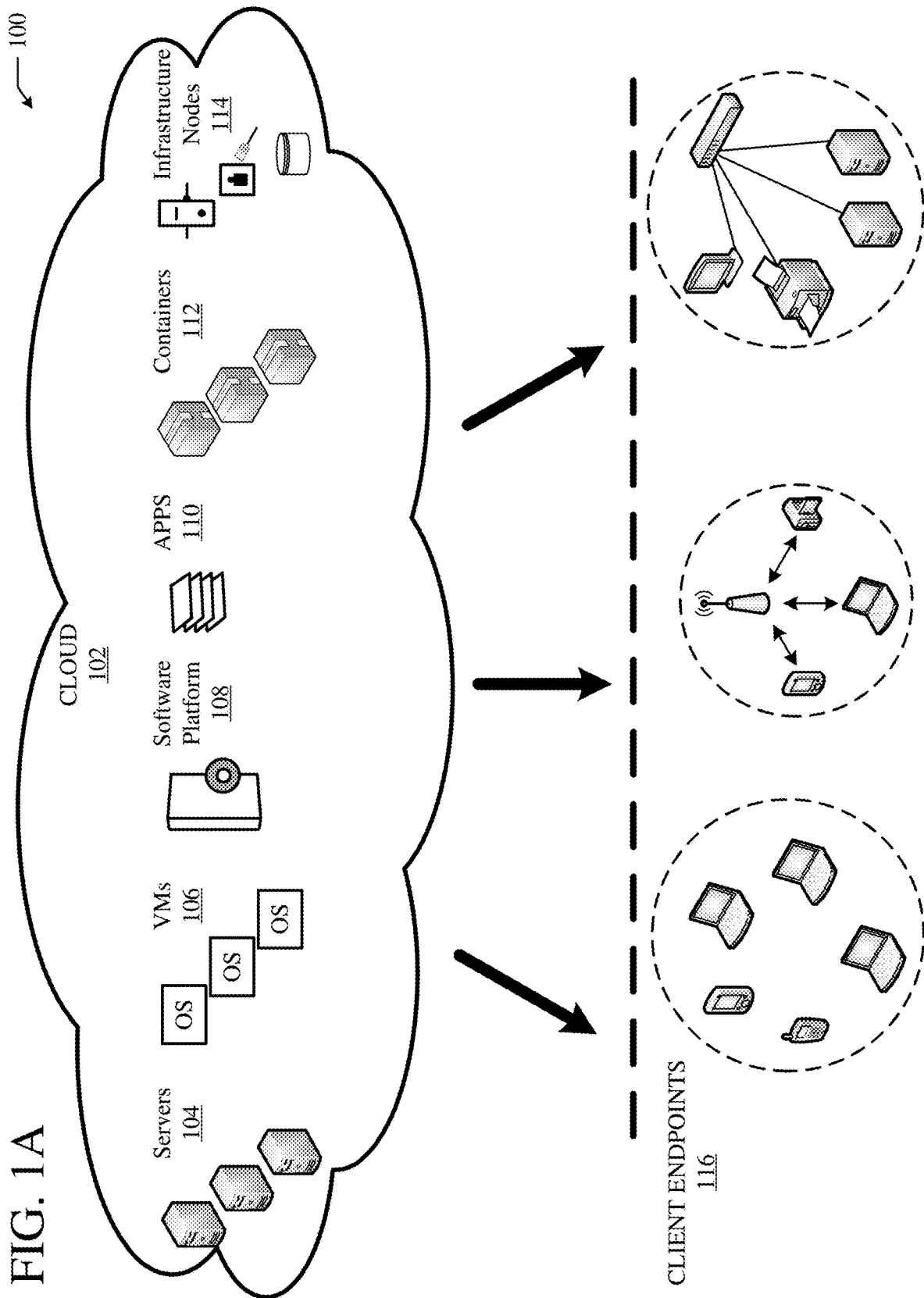
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include chunking, at a controller of a SDN environment, a policy into a plurality of chunks having corresponding chunk identifications. The method can also include hashing each of the plurality of policy chunks to create corresponding chunk hashes for each of the plurality of policy chunks. Further, the plurality of policy chunks, the chunk identifications of the plurality of policy chunks, and the chunk hashes of the plurality of policy chunks can be distributed from the controller to an intermediate policy node in a fabric of the SDN environment. The chunk identifications and the chunk hashes of the plurality of policy chunks can be used to control distribution of the plurality of policy chunks to one or more edge nodes in the SDN environment.

A system can include one or more processors and at least one computer-readable storage medium storing instructions which, when executed by the one or more processors, cause the one or more processors to chunk, at a controller of a SDN environment, a policy into a plurality of chunks having corresponding chunk identifications. The instructions can also cause the one or more processors to hash each of the plurality of policy chunks to create corresponding chunk hashes for each of the plurality of policy chunks. Further, the instructions can cause the one or more processors to distribute the plurality of policy chunks, the chunk identifications of the plurality of policy chunks, and the chunk hashes of the plurality of policy chunks from the controller to an intermediate policy node in a fabric of the SDN environment. The chunk identifications and the chunk hashes of the plurality of policy chunks can be used to control distribution of the plurality of policy chunks to one or more edge nodes in the SDN environment. Specifically, the instructions can cause the one or more processors to transmit a chunk identification and a chunk hash of a policy chunk of the plurality of policy chunks from the intermediate policy node to an edge node of the one or more edge nodes. The edge node can be configured to retrieve the policy chunk using the chunk identification and the chunk hash and implement policy at an EP associated with the edge node using the policy chunk.

A non-transitory computer-readable storage medium having stored therein instructions which, when executed by a processor, cause the processor to chunk, at a controller of a SDN environment, a policy into a plurality of chunks having corresponding chunk identifications. Specifically, the processor can cause the processor to chunk at least a portion of the plurality of policy chunks into variable size policy chunks based on characteristics of the policy. The instructions can also cause the processor to hash each of the plurality of policy chunks to create corresponding chunk hashes for each of the plurality of policy chunks. Further, the instructions can cause the processor to distribute the plurality of policy chunks, the chunk identifications of the plurality of policy chunks, and the chunk hashes of the plurality of policy chunks from the controller to an intermediate policy node in a fabric of the SDN environment. The chunk identifications and the chunk hashes of the plurality of policy chunks can be used to control distribution of the plurality of policy chunks to one or more edge nodes in the SDN environment.

EXAMPLE EMBODIMENTS

The disclosed technology addresses the need in the art for efficiently managing policy implementation in SDN environments, and in particular the need in the art for efficiently managing policy implementation in SDN environments extended outside of centralized on-premises SDN environments. The present technology involves system, methods, and computer-readable media for distributing policies in a SDN environment through chunking. Additionally, the present technology involves systems, methods, and computer-readable media for controlling distribution of policy chunks from an intermediate policy node to edge nodes in the SDN environment using chunk identifications and chunk hashes of the policy chunks.

Figure 3:
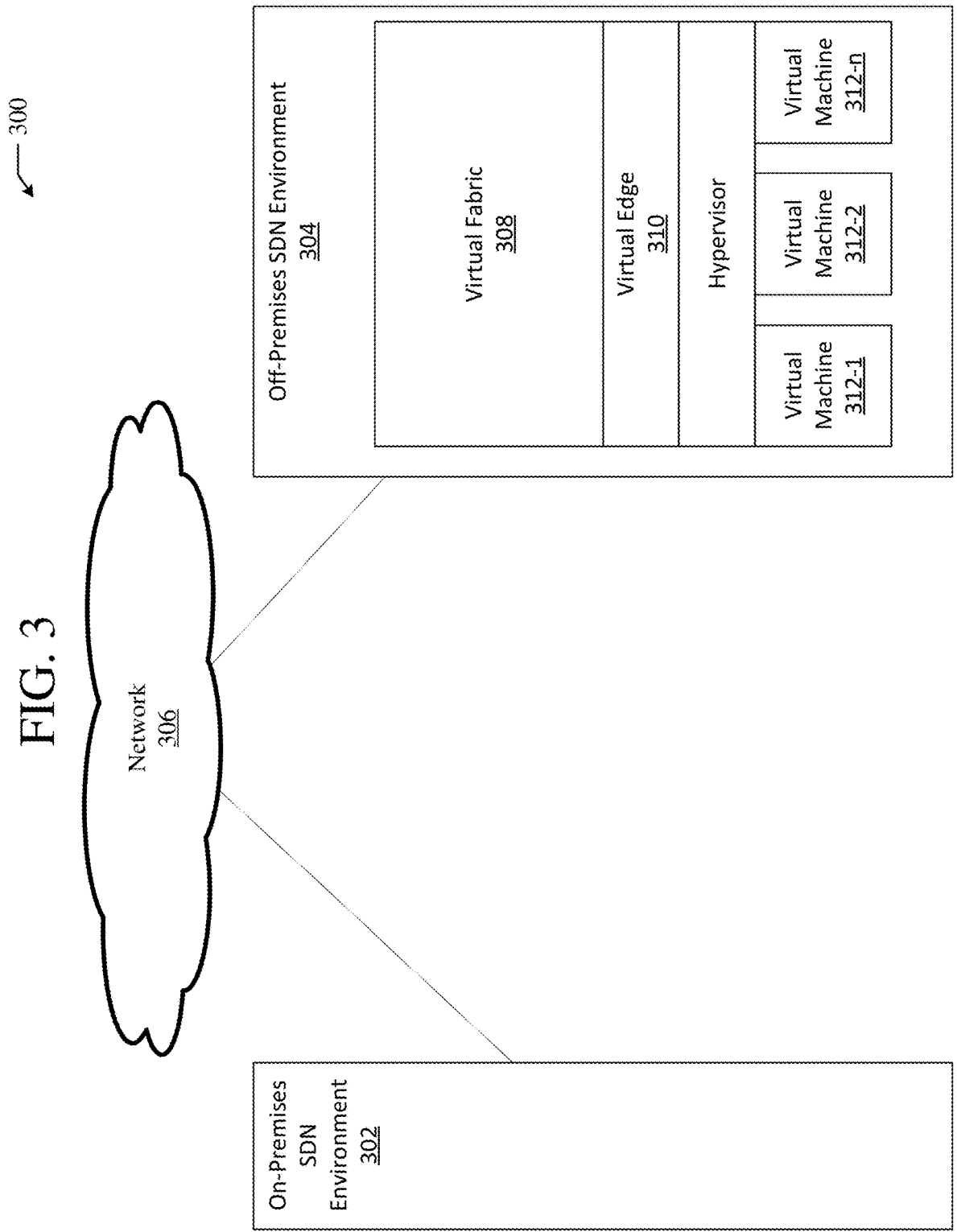
FIG. 3 shows an example environment of an extended SDN.
Figure 4:
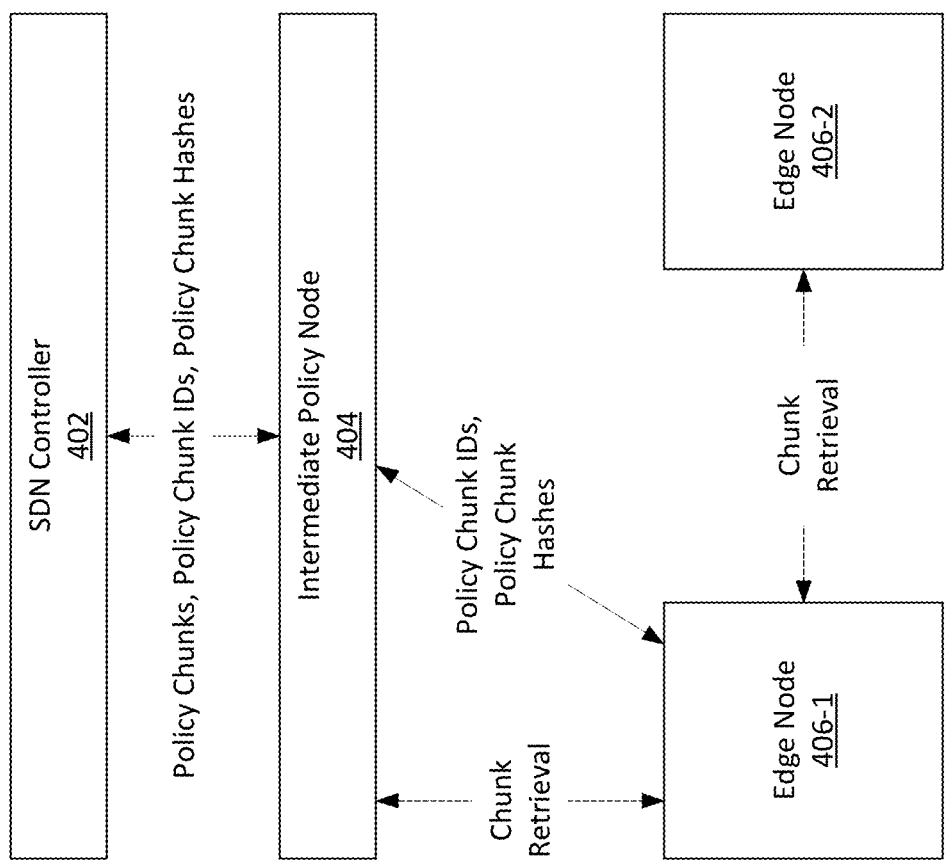
FIG. 4 shows an example SDN environment for controlling policy distribution and management through chunking.
Figure 5:
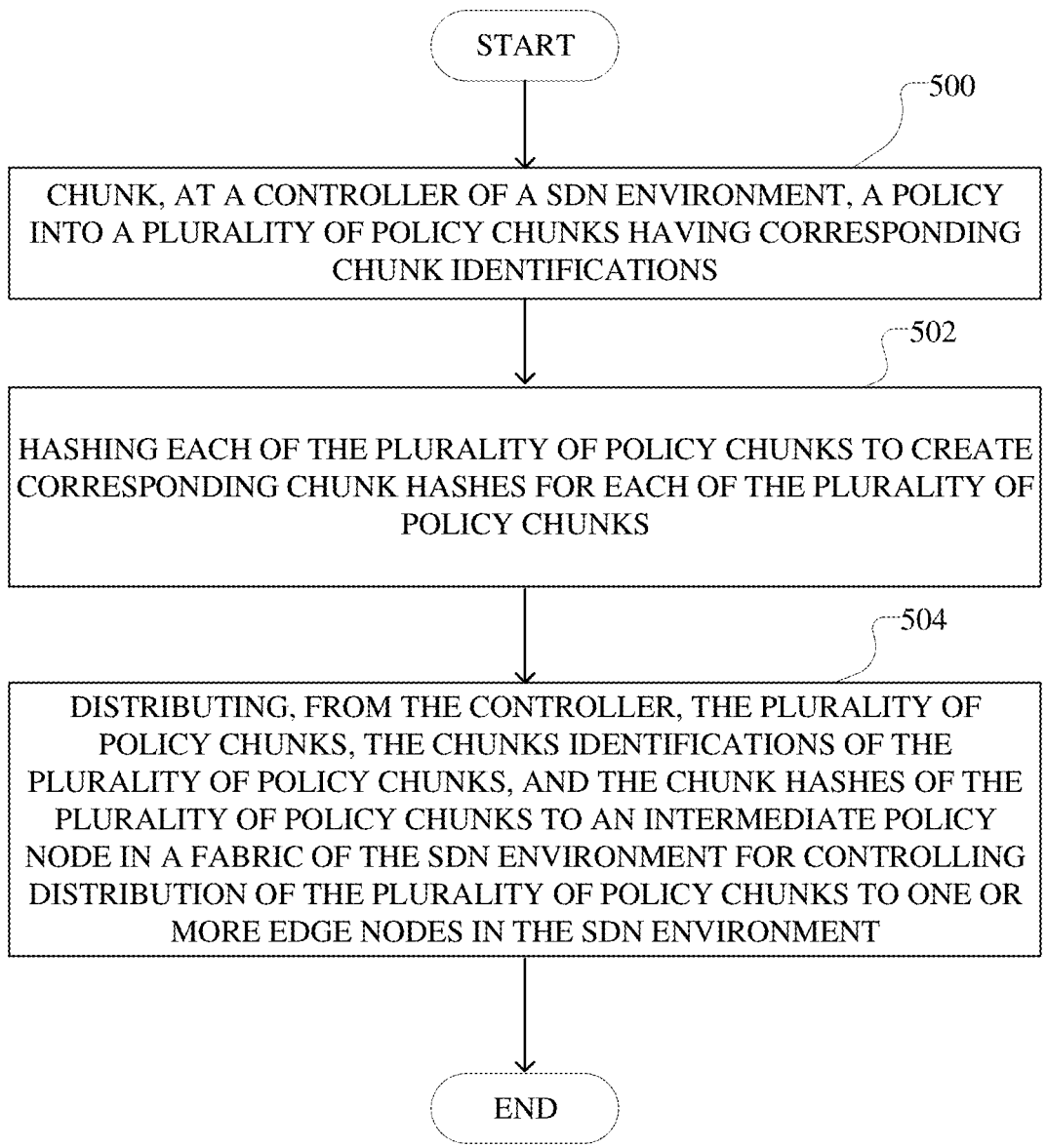
FIG. 5 illustrates a flowchart for an example method of controlling policy distribution and management in a SDN environment using policy chunks.
Figure 6:
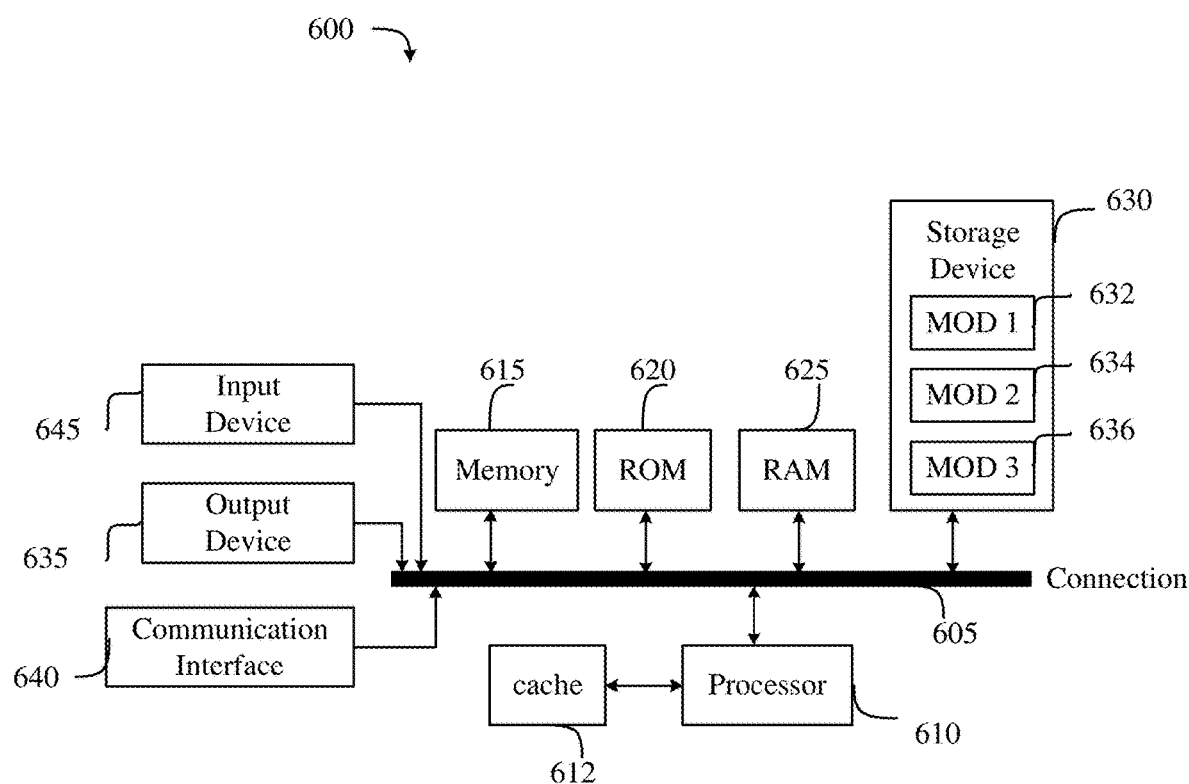
FIG. 6 illustrates an example computing system.
Figure 7:
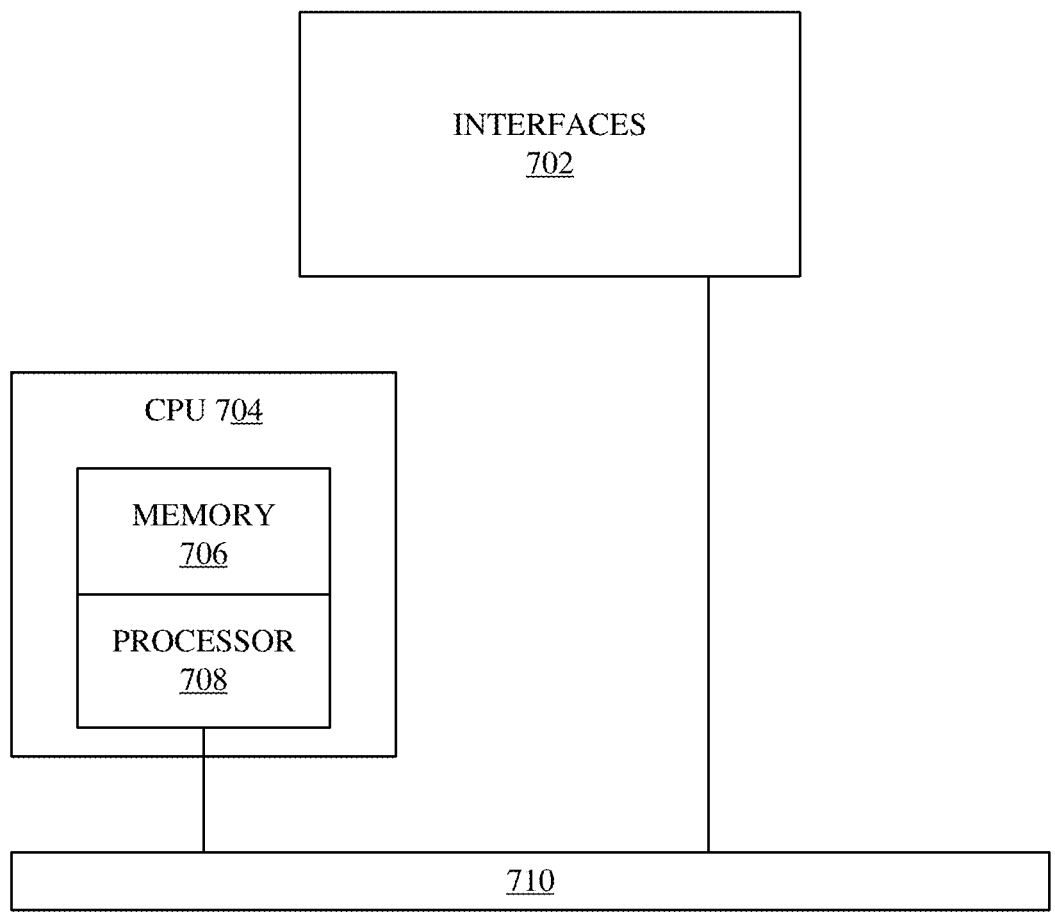
FIG. 7 illustrates an example network device.

A description of network environments and architectures for network data access and services, as illustrated in FIGS. 1A, 1B, 2A, 2B is first disclosed herein. A discussion of systems, methods, and computer-readable media for controlling policy distribution and management through policy chunking, as shown in FIGS. 3-5, will then follow. The discussion then concludes with a brief description of example devices, as illustrated in FIGS. 6 and 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
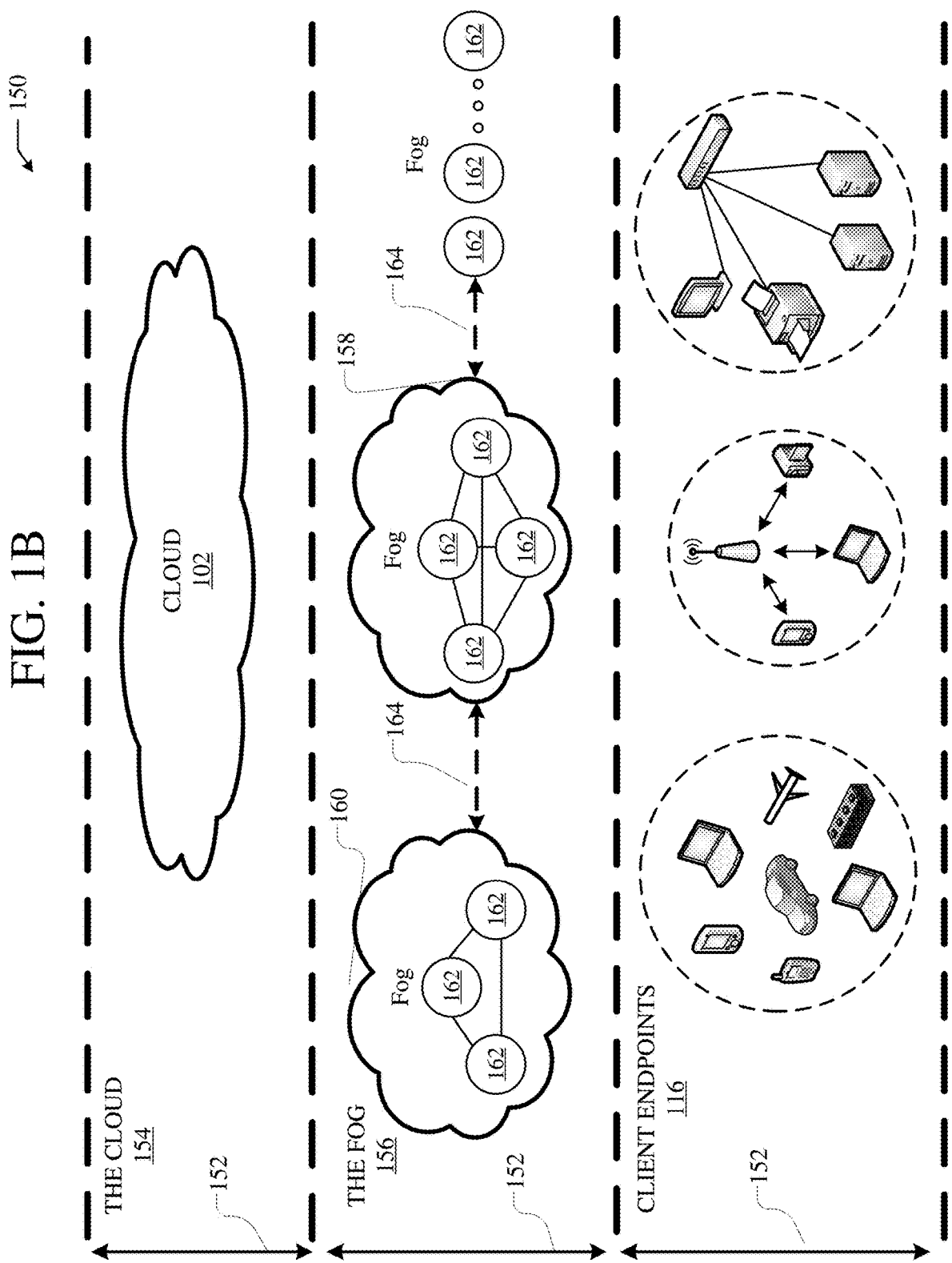
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
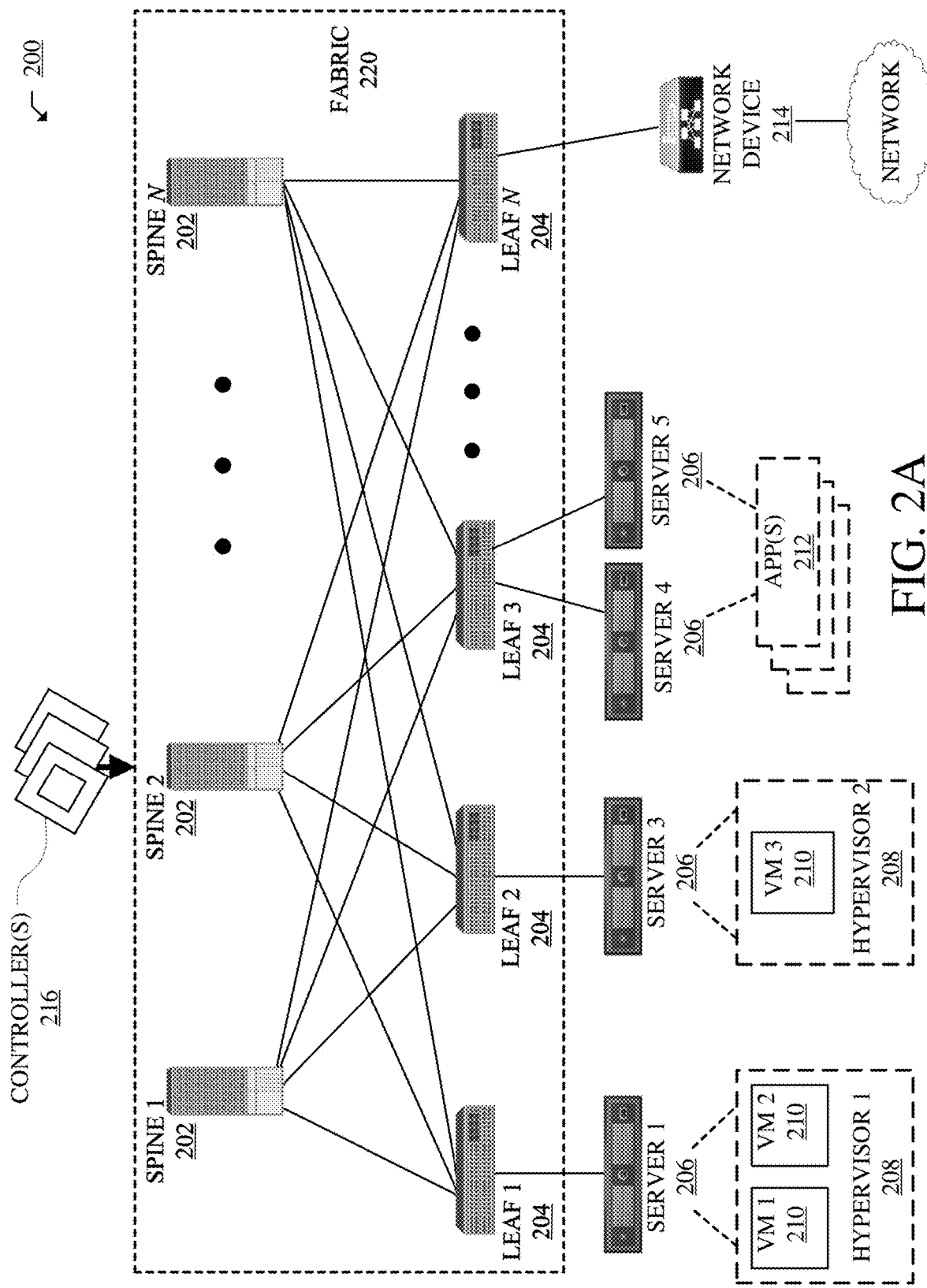
FIG. 2A illustrates a diagram of an example network environment, such as a data center.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 can be migrated to other Servers 206. Servers 206 can similarly be migrated to other physical locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a SDN infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), AVE nodes, vector packet processing (VPP) switches; VCENTER and NSX MANAGERS; bare metal physical hosts; HYPER-V hosts; VMs; DOCKER Containers; etc.

Figure 2B:
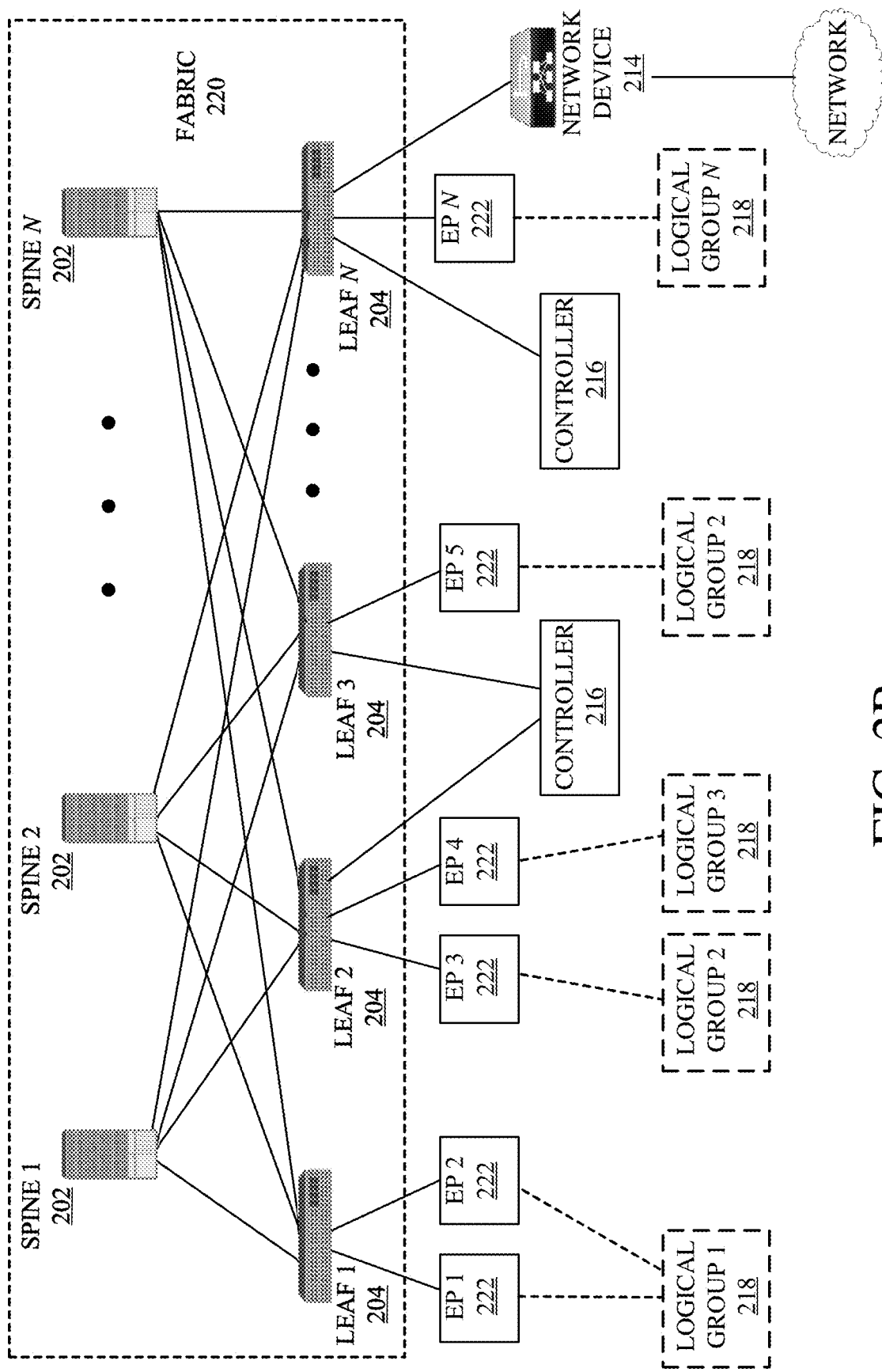
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between EPs or EPGs. For example, a Web EPG can provide a service that a Client EPG consumes, and that consumption can be subject to a filter (ACL) and a service graph that includes one or more services, such as firewall inspection services and server load balancing.

As discussed previously, in SDN environments, policies are implemented to control communication across nodes in the SDN environments. Specifically, in SDN environments, EPs and EPGs function as fundamental building blocks for accessing network services that are controlled through policies. More specifically, in SDN environments, contracts are used to implement policies for controlling communications between EPs and EPGs for providing network service access.

As SDN environments become more complex and as policies implemented in the SDN environments become larger, it becomes more difficult to effectively implement and maintain policies in SDN environments, e.g. for controlling EPGs in the SDN environments. Specifically, policies in an SDN environment can be maintained as trees that are pushed from a controller, while network states, e.g. states of policies in the SDN environment, are maintained at the controller. However, a large amount of back and forth communication between the controller and nodes in the SDN environment is needed to ensure that the policies are actually implemented correctly in the SDN environment. This problem is further exacerbated as the SDN environment and the policies grow in size and complexity.

In maintaining policy state, a controller can track which policy is deployed in which part of a fabric of a SDN environment. Specifically, the controller can observe any changes either due to user modification of the policies or EP mobility, and subsequently reconcile the changes correctly and inform all affected network elements of the relevant changes. These tasks become further difficult to perform by the controller when the SDN environment and the policies grow in size and complexity.

Further, while these problems exist in an on-premises basis, these problems become further exacerbated when SDN environments are extended outside of a premises. Specifically, when an SDN environment is extended out of a datacenter to another environment, e.g. the cloud, these problems associated with policy distribution are further exacerbated.

The present includes systems, methods, and computer-readable media for distributing policies in a SDN environment through chunking. Specifically, a policy can be chunked, at a controller of a SDN environment, into a plurality of policy chunks having corresponding chunk identifications. At least a portion of the plurality of policy chunks can be variable size policy chunks that are created based on characteristics of the policy. Each of the plurality of policy chunks can be hashed to create corresponding chunk hashes for each of the plurality of policy chunks. The plurality of policy chunks the chunk identifications, and the chunk hashes can be distributed from the controller of the SDN environment to an intermediate policy node in a fabric of the SDN environment. Specifically, the policy chunks, the chunk identifications, and the chunk hashes can be transmitted to an intermediate policy node for controlling distribution of the plurality of policy chunks to one or more edge nodes in the SDN environment using the chunk identification and the chunk hashes. In turn, a chunk identification and a chunk hash of a policy chunk of the plurality of policy chunks can be transmitted from the intermediate policy node to an edge node of the one or more edge nodes in the SDN environment. The edge node can be configured to retrieve the policy chunk using the chunk identification and the chunk hash and implement the policy for an EP associated with the edge node using the policy chunk.

FIG. 3 shows an example environment 300 of an extended SDN. Specifically, the example environment 300 shown in FIG. 3 includes an on-premises SDN environment 302 and an off-premises SDN environment 304. The on-premises SDN environment 302 and the off-premises SDN environment 304 are coupled to each other through the network 306. The network 306 can be an applicable network for coupling different network environments. For example, the network 306 can be an IP network that couples the on-premises SDN environment 302 to the off-premises SDN environment 304.

The on-premises SDN environment 302 is a network environment implemented locally with respect to an entity. For example, the on-premises SDN environment 302 can be a SDN environment implemented locally in a data center of an entity. The on-premises SDN environment 302 can be implemented according to an applicable SDN environment for providing network service access. For example, the on-premises SDN environment 302 can be implemented through the network environment 200 shown in FIGS. 2A and 2B.

The on-premises SDN environment 302 can include a software-defined datacenter fabric which resides on-premises, such as ACI. The on-premises SDN environment 302 can also include a cluster of SDN controllers which reside on-premises. The on-premises SDN controllers can function to enforce user intent and policies on networking elements and end-points on-premises, e.g. in the on-premises SDN environment 302. Further, the on-premises SDN controllers can function to enforce user intent and policies on networking elements and-points off-premises, e.g. in the off-premises SDN environment 304. For example, the on-premises SDN controllers can include APIC controllers in an ACI environment.

The off-premises SDN environment 304 is a network environment implemented remote with respect to an entity. Specifically, the off-premises SDN environment 304 can be implemented in a cloud environment remote from an entity. More specifically, the off-premises SDN environment 304 can be implemented in an applicable cloud computing architecture, such as the cloud computing architecture 100 shown in FIG. 1A. For example, the off-premises SDN environment 304 can be implemented through an applicable extension of the on-premises SDN environment 302 to a remote environment, such as a vPOD extension. This remote extension can be to a public cloud (such as a baremetal cloud), to a branch office/colo facility, or another applicable deployment.

The off-premises SDN environment 304 includes a virtual fabric 308, a virtual edge 310, and virtual machines 312-1 . . . 312-n (virtual machines 312). The virtual fabric 308 can function to virtually form a fabric of an SDN environment for the on-premises SDN environment 302, e.g. as a vPOD for the on-premises SDN environment 302. Specifically, the virtual fabric 308 can include either or both a plurality of virtual leaf and spine routers for forming a SDN environment, e.g. as an extension of the on-premises SDN environment 302. The virtual fabric 308 can be used to support data paths for providing network service access to EPs and EPGs through the off-premises SDN environment 304. Further, the virtual fabric 308 can be used by an applicable virtual node, e.g. a virtual TOR (vTOR), to control distribution and implementation of policies in the off-premises SDN environment 304. Specifically, a virtual node in the virtual fabric 308 can be used to distribute policies implemented and controlled through the virtual edge 310.

The virtual machines 312 function to implement EPs and corresponding EPGs for providing network service access, through the virtual edge 310 in the off-premises SDN environment 304. The virtual machines 312 can be configured and controlled through one or more hypervisors in the off-premises SDN environment 304, e.g. the virtual edge 310. Specifically, the one or more hypervisors, e.g. independent virtual form-factor switching devices, can be deployed on physical servers hosting workload VMs and/or containers in the off-premises SDN environment. The workload VMs and/or containers hosted by the physical servers can implement EPs and EPGs for accessing network services through the off-premises SDN environment 304.

FIG. 4 shows an example SDN environment 400 for distributing policies through chunking. The example SDN environment 400 shown in FIG. 4, as will be discussed in greater detail later, can be implemented in either or both an on-premises SDN environment and an off-premises SDN environment, such as the on-premises SDN environment 302 and the off-premises SDN environment 304 shown in FIG. 3. In turn, the policy chunking techniques described with respect to the example SDN environment 400 shown in FIG. 4 can be used to overcome the previously described deficiencies of policy distribution and management in on-premises SDN environments. For example, distributing policies as policy chunks can conserve resources by eliminating the need to distribute an entire policy tree, e.g. each time a new EP is instantiated in an SDN environment.

Further, the policy chunking techniques described with respect to the example SDN environment 400 shown in FIG. 4 can be used to overcome deficiencies of policy distribution and management in off-premises SDN environments, including the previously described deficiencies. In particular, an increased scale of policy control at a decreased cost, e.g. of used network resources, for controlling policies can be realized using the techniques described herein. More specifically, as the intermediate policy nodes, as will be discussed in greater detail later, are not in the forwarding path and are deployed solely as a middle-tier to distribute policies from an SDN controller, it is desirable to deploy as few of the intermediate policy nodes as possible. In turn, by distributing policies as policy chunks instead of policy trees, the number of intermediate policy nodes needed to control policies in the SDN environment 400 can be reduced. Further, as off-premises SDN environments are connected using an IP network round-trip delay times can increase and reliability can decrease. However, these problems can be mitigated by transferring less data, e.g. policy chunks, in performing policy control. Additionally, in off-premises SDN environments, edge nodes are usually the only data path presence for SDN controllers. Accordingly, the edge nodes become responsible for several additional critical features, when compared to on-premises edge nodes, to enforce policies in facilitating inter-EPG, intra/inter policy node communication for EPGs. This substantially increases the amount of configuration information needed at each edge node. By effectively distributing the policy configuration information to edge nodes through policy chunks, the amount of resources used to provide this needed information to the edge nodes is reduced. As follows, the policy chunks can be selectively removed from the edge nodes in the off-premises SDN environment without large amounts of back and forth communication between nodes in the off-premises SDN environment and SDN controllers.

The example SDN environment 400 shown in FIG. 4 includes a SDN controller 402, an intermediate policy node 404, a first edge node 406-1 and a second edge node 406-2 (edge nodes 406). The SDN controller 402 functions according to an applicable controller of an SDN environment, such as the controller(s) 216 in the example environments shown in FIGS. 2A and 2B. The SDN controller 402 can be an applicable controller implemented in an on-premises SDN environment, e.g. an ACI APIC controller. In being implemented in an on-premises SDN environment, the SDN controller 402 can function to control SDN operation within the on-premises SDN environment. For example, the SDN controller 402 can control policy distribution and management within the on-premises SDN environment. Further, while being implemented in an on-premises SDN environment, the SDN controller 402 can function to control SDN operation within an off-premises SDN environment, e.g. an off-premises SDN environment associated with the on-premises SDN environment. For example, the SDN controller 402 can control policy distribution and management within the off-premises SDN environment. More specifically, the SDN controller 402 can control policy distribution and management within the off-premises SDN environment from the on-premises SDN environment.

The intermediate policy node 404 functions as an intermediate node for controlling deployment and management of policies in the SDN environment 400. In controlling deployment and management of policies in the SDN environment 400, the intermediate policy node 404 can be excluded from a data forwarding path for providing network service access to EPs and EPGs in the SDN environment 400. In particular, the intermediate policy node 404 can be deployed solely for policy distribution and management in the SDN environment 400. For example, the intermediate policy node 404 can send and receive data for implementing policies in the SDN environment 400, while not sending and receiving actual traffic for providing EPs and EPGs network service access in the SDN environment 400. The intermediate policy node 404 can be implemented in an on-premises SDN environment in the fabric of the on-premises SDN environment. Further, the intermediate policy node 404 can be implemented in an off-premises SDN environment in a virtual fabric, e.g. a virtual Leaf (vLeaf), of the off-premises SDN environment, e.g. at a virtual Top of Rack switch (vTOR).

The edge nodes 406 are implemented at the edge of the SDN environment 400 and function to instantiate and manage EPs and EPGs for accessing network services through the SDN environment 400. In particular, the edge nodes 406 can set up and enforce policies for controlling EPs and EPG access to network services through the SDN environment 400. More specifically, the edge nodes 406 can enforce policies in the data path to and from the EPs and EPGs in accessing network services through the SDN environment 400. As will be discussed in greater detail later, the edge nodes 406 can set up and enforce policies for EPs as EPs are instantiated and join EPGs associated with or otherwise managed by the edge nodes 406. The edge nodes 406 can be implemented in an on-premises SDN environment, e.g. as servers in the fabric of the on-premises SDN environment. Further, the edge nodes 406 can be implemented in an off-premises SDN environment, e.g. as an ACI virtual edge (AVE). For example, the edge nodes 406 can be implemented in the off-premises SDN environment as one or more hypervisor independent virtual form-factor switching devices deployed on physical servers hosting workload VMs/containers in the virtual fabric of the off-premises SDN.

As discussed previously, in current SDN environments, policies are sent in their entirety to either or both the intermediate policy node 404 and the edge nodes 406 for implementing the policies. Specifically, the SDN controller 402 sends policies maintained as trees to the intermediate policy node 404 and the edge nodes 406, which becomes more and more difficult as the policy trees grow in size. Further, the SDN controller 402 communicates back and forth with the intermediate policy node 404 and/or the edge nodes 406 to ensure that policies are implemented correctly using the policy trees. This back and forth communication can consume resources in the SDN environment 400.

In particular, the amount of configuration needed upfront at the access layer, e.g. the edge nodes 406, to bring up EPs in order to support the rich feature set offered by ACI can quickly become quite large and complex. Specifically, as more features are added and the number of EPs and EPGs and associated pairwise contracts scales, the configuration at the access layer becomes more complex. Furthermore, due to mobility requirements of EPs and limited resources available at every network element, the SDN controller 402 can distribute the policies for a particular EPG to an intermediate policy node 404 and subsequently the edge nodes 406 on-demand when the first EP in that EPG is instantiated on the edge nodes 406. This can further consume valuable resources in the SDN environment 400. Additionally, these policies need to be duly cleaned up when the last EP goes away for the EPG to reclaim the resources. The SDN controller 402 also needs to carefully track which policy is deployed in which part of an SDN fabric and if there are any changes either due to user modifications of the policies or EP mobility. Subsequently, the SDN controller 402 can reconcile the changes correctly and inform all affected network elements of the relevant changes. As discussed previously, while these tasks are challenging to correctly perform in an on-premises SDN environment, they become even harder to perform in an off-premises SDN environment.

In order to alleviate these problems, as well as the previously described problems with policy distribution and control in SDN environments, the SDN controller 402 can facilitate distribution of the policy as policy chunks. Specifically, the SDN controller 402 can chunk a policy into a plurality of policy chunks. The SDN controller 402 can then distribute one or more of the plurality of policy chunks to the intermediate policy node 404. As will be discussed in greater detail later, the intermediate policy node 404 can provide the policy chunks on a per-portion basis instead of distributing an entire policy, e.g. a policy, tree whenever an EP needing the policy is instantiated. This can reduce the amount of resources of the SDN environment 400 that are used to distribute and manage policies in the SDN environment 400. Further, the policy chunks can be retrieve locally, e.g. from other edge nodes, thereby reducing the burden on the intermediate policy node 404 in distributing policies, e.g. through policy chunks.

In chunking a policy into a plurality of policy chunks, the SDN controller 402 can create chunk identifications for each of the policy chunks. In turn, the chunk identifications can be transferred to the intermediate policy node 404 along with the plurality of policy chunks. As will be discussed in greater detail later, the chunk identifications can be used to control distribution of the policy chunks through the SDN environment 400.

The SDN controller 402 can chunk the policy into policy chunks using a static technique. Specifically, the SDN controller can chunk the policy into policy chunks of fixed size. For example, the SDN controller 402 can chunk the polity into policy chunks that are all the same size and potentially reusable. Specifically, an EPG can be associated with a BD, and each BD is part of a tenant VRF that includes a plurality of BDs. Accordingly, the BD and VRF configurations can be shared across multiple EPGs. Therefore, the SDN controller 402 can generate static policy chunks that are shared for commonly reused configurations, e.g. netflow collector and SPAN. The SDN controller 402 can chunk the policy into fixed size policy chunks that are reusable across EPs and EPGs using an applicable technique. Specifically, the SDN controller 402 can chunk the policy into fixed size policy chunks based on characteristics of the policy that is chunked into the policy chunks. For example, the SDN controller 402 can chunk the policy into fixed size policy chunks to include similar features of the policy that are reusable across EPs and EPGs.

Additionally, the SDN controller 402 can chunk the policy into policy chunks using a dynamic technique. Specifically, the SDN controller 402 can chunk the policy into policy chunks of different sizes across the chunks according to an applicable dynamic technique. More specifically, the SDN controller 402 can use an applicable technique for chunking the policy into variable sized policy chunks, such as Rabin fingerprinting. Further, the SDN controller 402 can chunk the policy into variable sized policy chunks based on characteristics of one or a combination of an EP, an EPG, or the policy itself. For example, the SDN controller 402 can chunk the policy based on contracts and micro-segmentation criteria, which can be arbitrarily sized for each EPG, into variable sized chunks. The SDN controller 402 can create the variable sized policy chunks as reusable chunks which are shift-resistant, e.g. a single line of configuration change such as a new contract rule will not cause many of the chunks to be recomputed. Since the SDN controller 402 understands each of the features associated with an EPG, the SDN controller can make a decision to use static or dynamic chunking techniques for each EPG as needed.

Further, in chunking a policy into a plurality of policy chunks, the SDN controller 402, can hash each of the policy chunks to create chunk hashes for each of the policy chunks. Specifically, the SDN controller 402 can compute cryptohashes for each of the policy chunks. Hashing of each of the policy chunks by the SDN controller 402, as will be described in greater detail later, can serve as an integrity check for the policy chunks. The SDN controller can then transfer the chunk hashes for each of the policy chunks to the intermediate policy node 404 along with the plurality of policy chunks. As will be discussed in greater detail later, the chunk hashes can be used to control distribution of the policy chunks through the SDN environment 400. Further and as will be discussed in greater detail later, the chunk hashes can be used to verify that a received policy chunk is actually the requested/desired policy chunk.

The SDN controller 402 can create a configuration hash for the chunked policy. The configuration hash can be an EPG level hash that can be used, as will be discussed in greater detail later, to ensure that the policy is properly configured using the policy chunks. Specifically, the configuration hash can be used to determine whether necessary policy chunks are present at a node for properly configuring the policy using the policy chunks. The SDN controller 402 can transfer the configuration hash to the intermediate policy node 404 for properly configuring the policy using the policy chunks.

The intermediate policy node 404 can facilitate distribution of the policy chunks in the SDN environment 400. Specifically, the intermediate policy node 404 can facilitate distribution of the policy chunks to the edge nodes 406 in the SDN environment 400. The intermediate policy node 404 can facilitate distribution of the policy chunks in the SDN environment 400 using the policy chunk identifications for the policy chunks and the policy chunk hashes for the policy chunks. Specifically, the intermediate policy node 404 can receive a request for the policy from the first edge node 406-1. In response to the request, the intermediate policy node 404 can transfer policy identifications and policy hashes of at least a portion of the policy chunks to the first edge node 406-1. Further, the intermediate policy node 404 can transfer the configuration hash for the policy to the first edge node 406-1 in response to the request for the policy received from the first edge node 406-1.

The first edge node 406-1 can request the policy based on EPs associated with the first edge node 406-1. In particular, the policy can be associated with a specific EP. Subsequently, when the EP is newly instantiated in an EPG for the first edge node 406-1 and the first edge node 406-1 does not have the policy, the first edge node 406-1 can request the policy from the intermediate policy node 404. The first edge node 406-1 can then receive the chunk identifications and chunk hashes for the policy chunks of the policy from the intermediate policy node 404. In turn, the first edge node 406-1 can use the chunk identifications and chunk hashes for the policy chunks to retrieve the policy chunks. As follows, the first edge node 406-1 can use the retrieved policy chunks to implement the policy for the EP.

Before retrieving the policy chunks, the first edge node 406-1 can first check to see whether the policy chunks already reside at the first edge node 406-1. Specifically, the first edge node 406-1 can determine whether the policy chunks have already been received as part of a policy for another EP or EPG associated with the first edge node 406-1. For example, the first edge node 406-1 can determine whether the policy chunks are common policy chunks across different policies that are already present at the first edge node 406-1. If the policy chunks already reside at the first edge node 406-1, then the first edge node 406-1 can refrain from retrieving the policy chunks from an external node to the first edge node 406-1.

If the first edge node 406-1 determines that the policy chunks are not present at the first edge node 406-1, then the first edge node 406-1 can locally retrieve, or attempt to locally retrieve, the policy chunks. Locally retrieve, as used herein, can include retrieving, or attempting to retrieve, policy chunks from other edge nodes, e.g. other neighboring edge nodes to the first edge node 406-1. The first edge node 406-1 can use the policy identifications of policy chunks to locally retrieve the policy chunk. For example, the first edge node 406-1 can query the second edge node 406-2 for a specific policy chunk using an identification of the policy chunk. Subsequently, the first edge node 406-1 can receive the policy chunk from the second edge node 406-2 if the second edge node has the policy chunk. In various embodiments, the first edge node 406-1 can request the policy chunks from a plurality of other edge nodes simultaneously. For example, the first edge node 406-1 can set up multiple overlay sessions with other edge nodes for retrieving the policy chunks in parallel.

Further, the first edge node 406-1 can retrieve the policy chunks from the intermediate policy node 404 using the policy chunk identifications for the policy chunks. Specifically, the first edge node 406-1 can retrieve the policy chunks from the intermediate policy node 404 after attempting to locally retrieve the policy chunks. For example, if the second edge node 406-2 does not have a specific policy chunk, then after attempting to locally retrieve the policy chunk from the second edge node 406-2, the first edge node 406-1 can query the intermediate policy node 404 for the policy chunk. In turn, the first edge node 406-1 can receive the specific policy chunk from the intermediate policy node 404 and use the policy chunk to implement the policy.

As part of retrieving the policy chunks, the first edge node 406-1 can verify that the received policy chunks are the actual policy chunks corresponding to the chunk identifications. Specifically, the first edge node 406-1 can verify that policy chunks received from both other edge nodes, e.g. the second edge node 406-2 and the intermediate policy node 404, are the actual policy chunks corresponding to the chunk identifications. For example, the first edge node 406-1 can verify that the received policy chunks are the correct, e.g. most current version, of the policy chunks corresponding to the chunk identifications. The first edge node 406-1 can use the corresponding chunk hashes of the policy chunks to verify that the received policy chunks are the actual policy chunks corresponding to the chunk identifications. For example, the first edge node 406-1 can use a chunk hash of a policy chunk received from the second edge node 406-2 to verify that the policy chunk is the correct policy chunk, e.g. current version, of the policy chunk corresponding to a chunk identification.

After retrieving a policy chunk and verifying that the policy chunk is a correct policy chunk, the first edge node 406-1 can become a proxy for the policy chunk to other edge nodes. Specifically other edge nodes can query the first edge node 406-1 for the policy chunk, as part of locally retrieving the policy chunk. Subsequently, the first edge node 406-1 can provide the policy chunk to the other edge nodes. This can reduce the burdens on the intermediate policy node 404 in having to distribute the policy chunk to a plurality of edge nodes in a group of edge nodes, when the policy chunk already resides locally in the group of edge nodes. In turn, this can solve the previously described deficiencies of policy control and distribution in SDN environments.

The first edge node 406-1 can receive a configuration hash for the policy from the intermediate policy node 404. In turn, the first edge node 406-1 can use the configuration hash to properly configure the policy using retrieved policy chunks. Specifically, the first edge node 406-1 can use the configuration hash to determine whether the first edge node 406-1 has retrieved all of the policy chunks needed to implement the policy. Subsequently, the first edge node 406-1 can implement the policy using the retrieved policy chunks if it determines, using the configuration hash, that the retrieved policy chunks can implement the policy correctly. Alternatively, the first edge node 406-1 can retrieve additional policy chunks used to implement the policy correctly, if it determines, using the configuration hash, that the retrieved policy chunks are insufficient to correctly implement the policy.

Distribution of the policy chunks through the edge nodes 406 can be controlled using a distributed key-value store. The distributed key-value store can be maintained at or be accessible by one or a combination of the SDN controller 402, the intermediate policy node 404, and the edge nodes 406. Alternatively the distributed key-value store can be maintained remote from one or a combination of the SDN controller 402, the intermediate policy node 404, and the edge nodes 406. The distributed key-value store can be maintained according to an applicable technique for storing key-values, such as a Redis key value table. Further, the distributed key-value store can be maintained by one or a combination of the SDN controller 402, the intermediate policy node 404, and the edge nodes 406. For example, if the first edge node 406-1 obtains, a policy chunk, then the first edge node 406-1 can update the distributed key-value store to indicate that it is a proxy for the policy chunk.

The distributed key-value store can include an association of policy chunks, e.g. policy chunk identifications, with end points where the policy chunks reside. For example, the distributed key-value store can be maintained as a distributed Redis key-value store that can advertise the policy chunks each edge node currently possesses to its immediate neighborhood, e.g. based on network locality. In turn, the edge nodes can use the distributed key-value store to query edge nodes that poses a desired policy chunk, as indicated by the distributed key-value store. For example, the first edge node 406-1 can determine from the distributed key-value store that the second edge node 406-2 has a specific policy chunk. Subsequently, the first edge node 406-1 can locally retrieve the specific policy chunk from the second edge node 406-2 based on the second edge node 406-2 possessing the policy chunk, as indicated by the distributed key-value store.

The distributed key-value store can be updated based on retrieval of specific policy chunks by edge nodes 406, e.g. the edge nodes acting as subscribers to the specific policy chunks. Specifically, the distributed key-value store can be updated to indicate that a specific policy chunk resides at the first edge node 406-1 in response to the first edge node 406-1 retrieving, from either another edge node or the intermediate policy node 404, and validating the retrieved policy chunk. In turn, the updated distributed key-value store can be used by other edge nodes to retrieve the specific policy chunk from the first edge node 406-1. Further, the distributed key-value store can be updated based on removal of specific policy chunks from the edge nodes. For example, when policy chunks are removed from the edge nodes, e.g. as part of cleaning up the edge nodes, associations of the policy chunks to the edge nodes can be removed from the distributed key-value store.

The policy chunks distributed to the edge nodes 406 can be invalidated. Specifically, if the policy chunks change, then the policy chunks can be invalidated to reduce chances of distributing an incorrect or obsolete policy chunk amongst the edge nodes 406. As part of invalidating a policy chunk, the intermediate policy node 404 can send a notification to the edge nodes 406 that the policy chunk has been invalidated. In particular, the intermediate policy node 404 can send an invalid policy chunk notification to all edge nodes that are listed as a subscriber to the policy chunk. The invalid policy chunk notification can include an indication of the policy chunk that is invalid, e.g. a chunk identification, as well as a new chunk identification and/or new chunk hash value for a corresponding new policy chunk. As follows, the edge nodes can use the invalid policy chunk notification, e.g. the new chunk hash value and new chunk identification, to retrieve a current/new copy of the policy chunk. Specifically, the edge nodes can use the new chunk hash value to validate a new copy of the policy chunk retrieved from other edge nodes or the intermediate policy node 404.

The policy chunks can be removed from the edge nodes 406. Specifically, the policy chunks can be removed from the edge nodes 406 based on whether a corresponding EP for the policy chunks has disassociated from the SDN environment 400. For example, if a corresponding EP has left the first edge node 406-1, then a policy chunk for the EP can be removed from the first edge node 406-1. The intermediate policy node 404 can remove the policy from the edge nodes 406, e.g. based on EPs currently associated with the edge nodes 406. For example, the intermediate policy node 404 can send a cleanup request to the first edge node 406-1 indicating to remove policy chunks from the first edge node 406-1 based on a corresponding EP dissociating from the first edge node 406-1.

In various embodiments, the intermediate policy node 404 and/or the SDN controller 402 can organize edge nodes associated with the intermediate policy node 404. Specifically, the intermediate policy node 404 and/or the SDN controller 402 can organize edge nodes into sub-localities which can be used for co-operative caching and policy sharing according to the techniques described herein. More specifically, as the intermediate policy node 404 and/or the SDN controller 402 knows the physical location of each edge node, the intermediate policy node 404 and/or the SDN controller 402 can group the edge nodes according to their physical location for policy chunk distribution and management according to the techniques described herein FIG. 5 illustrates a flowchart for an example method of controlling policy distribution and management in a SDN environment using policy chunks. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated. Each module shown in FIG. 5 represents one or more steps, processes, methods or routines in the method.

At step 500, the SDN controller 402 chunks a policy into a plurality of policy chunks having corresponding chunk identifications. The SDN controller 402 can chunk the policy into the plurality of policy chunks including chunks of static size. Further, the SDN controller 402 can chunk the policy into the plurality of policy chunks including chunks of variable size. For example, the SDN controller 402 can chunk the policy into variable size chunks based on characteristics and features of the policy.

At step 502, the SDN controller 402 can hash each of the plurality of policy chunks to create corresponding chunk hashes for each of the plurality of policy chunks. The chunk hashes can be used to control distribution of the plurality of policy chunks through the SDN environment 400. Specifically, the chunk hashes can be used by the edge nodes 406 to validate received policy chunks for corresponding chunks identifications of the policy chunks.

At step 504, the SDN controller 402 distributes the policy chunks, the chunk identifications of the policy chunks, and the chunk hashes of the policy chunks to the intermediate policy node 404. In turn, the identifications of the policy chunks and the chunk hashes of the policy chunks can be used to control distribution of the policy chunks from the intermediate policy node 404 to the edge nodes 406. Specifically, the identifications and the chunks hashes of the policy chunks can be used to control distribution of the policy chunks as part of controlling distribution of the policy to the edge nodes 406. More specifically, the edge nodes 406 can use the identifications and the chunk hashes to try and locally retrieve the policy chunks, and subsequently retrieve the policy chunks from the intermediate policy node 404 if the edge nodes 406 are unable to locally retrieve the policy chunks.

The disclosure now turns to FIGS. 6 and 7, which illustrate example network devices and computing devices, such as switches, routers, load balancers, client devices, and so forth.

FIG. 6 illustrates a computing system architecture 600 wherein the components of the system are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610. The system 600 can include a cache 612 of high-speed memory connected directly with, in close proximity to, or integrated as part of the processor 610. The system 600 can copy data from the memory 615 and/or the storage device 630 to the cache 612 for quick access by the processor 610. In this way, the cache 612 can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 740 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device 700 suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   chunking, at a controller of a software-defined networking (SDN) environment, a policy into a plurality of policy chunks having corresponding chunk identifications;
   hashing each of the plurality of policy chunks to create corresponding chunk hashes for each of the plurality of policy chunks;
   distributing, from the controller of the SDN environment, the plurality of policy chunks, the chunk identifications of the plurality of policy chunks, and the chunk hashes of the plurality of policy chunks to an intermediate policy node in a fabric of the SDN environment; and
   retrieving, by one or more edge nodes in the SDN environment, the plurality of policy chunks using the chunk identifications and the chunk hashes either or both directly from the intermediate policy node or through local retrieval amongst the one or more edge nodes.

2. The method of claim 1, further comprising transmitting a chunk identification and a chunk hash of a policy chunk of the plurality of policy chunks from the intermediate policy node to an edge node of the one or more edge nodes in the SDN environment, wherein the edge node is configured to retrieve the policy chunk using the chunk identification and the chunk hash and implement the policy for an endpoint associated with the edge node using the policy chunk.

3. The method of claim 2, wherein the chunk identification and the chunk hash of the policy chunk is transmitted from the intermediate policy node to the edge node in response to a request for the policy chunk transmitted from the edge node to the intermediate policy node.

4. The method of claim 3, wherein the policy associated with the policy chunk is specific to the endpoint and the edge node transmits the request for the policy to the intermediate policy node in response to the endpoint joining an endpoint group associated with the edge node.

5. The method of claim 2, wherein the edge node is configured to locally retrieve the policy chunk from another edge node using the chunk identification and the chunk hash of the policy chunk.

6. The method of claim 5, wherein the edge node is configured to locally retrieve the policy chunk from the another edge node using a distributed key-value store distributed across the one or more edge nodes, including the edge node and the another edge node, wherein the distributed key-value store uniquely associates the policy chunk with the another edge node based on the policy chunk residing locally at the another edge node.

7. The method of claim 6, further comprising updating the distributed key-value store to uniquely associate the edge node with the policy chunk based on the policy chunk residing locally at the edge node after being retrieved from the another edge node.

8. The method of claim 2, wherein the edge node is configured to retrieve the policy chunk from the intermediate policy node.

9. The method of claim 8, wherein the edge node is configured to locally search for the policy chunk at one or more other edge nodes and retrieve the policy chunk from the intermediate policy node in response to the policy chunk being absent from the one or more other edge nodes.

10. The method of claim 2, wherein the edge node is further configured to use the chunk hash to verify that the retrieved policy chunk is a correct policy chunk corresponding to the chunk identification.

11. The method of claim 2, further comprising transmitting, from the intermediate policy node to the edge node, a configuration hash for the policy, wherein the edge node is configured to use the configuration hash to determine whether the edge node has received all policy chunks of the plurality of policy chunks for implementing the policy at the endpoint.

12. The method of claim 2, further comprising:
   transmitting, from the intermediate policy node to the edge node, a notification indicating that the policy chunk is invalid; and
   transmitting, from the intermediate policy node to the edge node, a new chunk identification and a new chunk hash of a new policy chunk of the policy, wherein the edge node is configured to retrieve the new policy chunk using the new chunk identification and the new chunk hash.

13. The method of claim 2, further comprising removing the policy chunk from the edge node and disassociating the edge node with the policy chunk in response to the endpoint disassociating from the edge node.

14. The method of claim 1, wherein at least a portion of the plurality of policy chunks are fixed size policy chunks.

15. The method of claim 1, wherein at least a portion of the plurality of policy chunks are variable size policy chunks and the policy is chunked into the variable size policy chunks based on characteristics of the policy.

16. A system comprising:
   one or more processors; and
   at least one computer-readable storage medium having stored therein instructions which, when executed by the one or more processors, cause the one or more processors to perform operations comprising:
      chunking, at a controller of a software-defined networking (SDN) environment, a policy into a plurality of policy chunks having corresponding chunk identifications;

hashing each of the plurality of policy chunks to create corresponding chunk hashes for each of the plurality of policy chunks;

distributing, from the controller of the SDN environment, the plurality of policy chunks, the chunk identifications of the plurality of policy chunks, and the chunk hashes of the plurality of policy chunks to an intermediate policy node in a fabric of the SDN environment; and transmitting a chunk identification and a chunk hash of a policy chunk of the plurality of policy chunks from the intermediate policy node to an edge node of one or more edge nodes in the SDN environment;

retrieving, by the edge node, the policy chunk using the chunk identification and the chunk hash either or both directly from the intermediate policy node or through local retrieval amongst the one or more edge nodes.

17. The system of claim 16, wherein the edge node is configured to locally retrieve the policy chunk from another edge node using the chunk identification of the policy chunk, the chunk hash of the policy chunk, and a distributed key-value store distributed across the one or more edge nodes, including the edge node and the another edge node, wherein the distributed key-value store uniquely associates the policy chunk with the another edge node based on the policy chunk residing locally at the another edge node.

18. The system of claim 16, wherein the edge node is configured to locally search for the policy chunk at one or more other edge nodes and retrieve the policy chunk from the intermediate policy node in response to the policy chunk being absent from the one or more other edge nodes.

19. The system of claim 16, wherein the instructions which, when executed by the one or more processors, further cause the one or more processors to perform operations comprising:

transmitting, from the intermediate policy node to the edge node, a notification indicating that the policy chunk is invalid; and transmitting, from the intermediate policy node to the edge node, a new chunk identification and a new chunk hash of a new policy chunk of the policy, wherein the edge node is configured to retrieve the new policy chunk using the new chunk identification and the new chunk hash.

20. A non-transitory computer-readable storage medium having stored therein instructions which, when executed by a processor, cause the processor to perform operations comprising:

chunking, at a controller of a software-defined networking (SDN) environment, a policy into a plurality of policy chunks having corresponding chunk identifications, wherein at least a portion of the plurality of policy chunk are variable size policy chunks and the policy is chunked into the variable size policy chunks based on characteristics of the policy;

hashing each of the plurality of policy chunks to create corresponding chunk hashes for each of the plurality of policy chunks; and distributing, from the controller of the SDN environment, the plurality of policy chunks, the chunk identifications of the plurality of policy chunks, and the chunk hashes of the plurality of policy chunks to an intermediate policy node in a fabric of the SDN environment; and retrieving, by one or more edge nodes in the SDN environment, the plurality of policy chunks using the chunk identifications and the chunk hashes either or both directly from the intermediate policy node or through local retrieval amongst the one or more edge nodes.

* * * * *